Sept. 25, 1945.  P. H. RHODES  2,385,373
METHOD OF PRODUCING A RESIN AND PRODUCT DERIVED THEREFROM
Filed Aug. 12, 1942
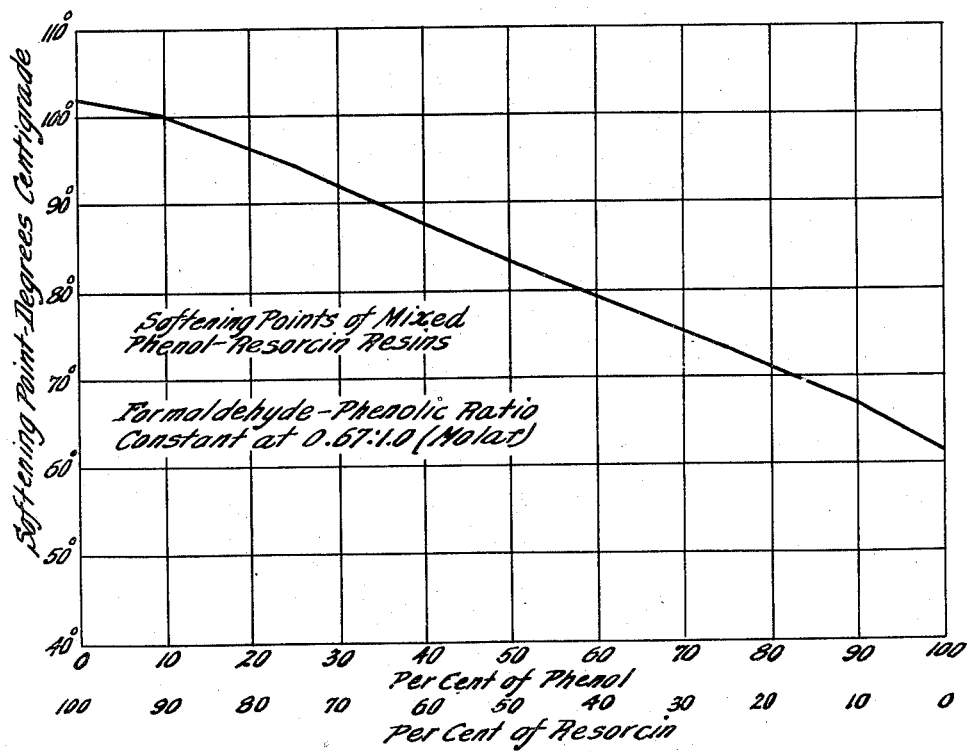
Inventor,
Philip Hamilton Rhodes
By Ivan P. Tashof,
Attorney Patented Sept. 25, 1945

2,385,373

UNITED STATES PATENT OFFICE 2,385,373

METHOD OF PRODUCING A RESIN AND PRODUCT DERIVED THEREFROM

Philip Hamilton Rhodes, Portland, Maine, assignor to Pennsylvania Coal Products Company, Petrolia, Pa., a corporation of Pennsylvania Application August 12, 1942, Serial No. 454,606

13 Claims. (Cl. 260—54)

The present invention relates to the manufacture of resinous masses and resins, and, more particularly, mixed composite resins containing the reaction product of a monohydric phenolic body and an aldehyde; and the reaction product of a polyhydroxy benzene body including the polyhydroxy benzenes themselves and an aldehyde.

In one form of the invention, a mixed composite resinous mass may be treated with a methylene-containing hardening agent adapted to convert the resinous mass into a potentially heat reactive product.

The monohydric phenolic body used in carrying out the present invention may be illustrated by compounds such as phenol itself, $C_6H_5OH$, cresol, cresylic acid, xylenols and the like. The term "monohydric phenol" is used in the present disclosure in its generic sense to cover not only phenol per se, $C_5H_5OH$, but the substituted phenols including those above set forth.

The terms "polyhydroxy benzene" and "dihydroxy benzene" are intended to include such compounds as resorcin, catechol, hydroquinone. The term polyhydroxy-benzene also includes the trihydric phenols such as pyrogallol, phloroglucinol, hydroxyquinol, and 1,2,4-$(OH)_3$-benzene.

In producing the so-called mixed resins, where a polyhydroxy benzene and particularly a dihydroxy benzene or its substitution product is one of the reacting bodies, the reaction must be carefully controlled in order to avoid the production of useless end products. Illustratively, the resorcin aldehyde reaction is a very sensitive one. Therefore, most of the resins of this character have been used as varnishes because their sensitivity inhibited adequate mechanical dehydration. In order to commercially utilize such resins, it has been proposed to load them with solvents such as alcohols or with plasticizers such as glycerine.

However, in none of the prior art methods wherein a mixture of a monohydric phenolic body and a polyhydric benzene body and especially a dihydric benzene body has been reacted with an aldehyde, has the final resinous reaction mass been characterized by consistent properties. The different batches have produced end products varying in physical and chemical properties, making the continuous production of a uniform resin or resinous mass substantially impossible. In general, different batches are characterized by different melting points, non-uniform high water content, and contain varying amounts of unreacted bodies including monohydric phenolic bodies and aldehyde. In short, these products are characterized by such disadvantages that their commercial use is greatly inhibited, and this is especially true when it is desired to blend the initial condensation product with a methylene-containing hardening agent to produce and utilize the heat reactive resin compound. This applies particularly in the bonding of abrasive articles with the resin as a bonding medium where the specifications require that the residual moisture in the bonding medium should not exceed .75% to 1.0%, and that the unreactive components present in the resin should be exceedingly small, not exceeding 2%. The following example illustrates the usual procedure employed in the manufacture of a mixed resin:

Phenol and resorcin are placed in a kettle with the required amount of catalyst and while the kettle is maintained at reflux temperature, the required amount of formaldehyde is added drop by drop or in a thin stream. The resulting resinous mass consists of a resorcin resin with the major portion of the phenol held mechanically in an unreacted stage. More specifically, 94 grams of phenol are mixed with 110 grams of resorcin and the mixture is placed in a suitable reaction flask with 2 grams of oxalic acid crystals and 40 grams of formaldehyde, and the mixture slowly heated to reflux temperature. To the resulting mass there is added drop by drop 70 grams of formaldehyde at such a rate as to maintain the reflux. Before all the formaldehyde has been added, the viscosity of the product is increased to such an extent that agitation will not handle it, and to all intents and purposes, the mixture is substantially useless. Upon examination, the end product comprises a mixture of unreacted phenol, unreacted formaldehyde, and a set-up resorcin resin.

If the above method is to be utilized at all, it is necessary that about 75% to 80% of the phenolic body be a polyhydroxy benzene or a dihydroxy benzene such as resorcin or the like. When the proportion of the monohydroxy phenolic body is greater than about 25%, the viscosity of the product increases to such an extent that control and adequate dehydration are substantially impossible. There is no doubt that when a polyhydroxy benzene, particularly a dihydroxy benzene, as for example, resorcin, and a monohydric phenolic body, as for example, phenol, are reacted together with an aldehyde, as for example, formaldehyde, in the presence of a catalyst, that the major reaction is between the resorcin and the aldehyde, leaving the monohydric phenolic body to a large extent unreacted and mechanically bound in the molecular interstices of the resorcin resin. In accordance with the present invention, a composite mixed resinous mass is produced by first reacting a monohydric phenolic body with an aldehyde preferably in the presence of a catalyst. There is separately formed a solution of a polyhydroxy benzene and especially a dihydric benzene and an aldehyde, care being taken that any reaction between these constituents is inhibited during said solution step. Thereafter, the solution of the dihydroxy benzene and the aldehyde is combined with the initial reaction product of the monohydric phenolic body and aldehyde. The mixture is then heat treated under such conditions as to cause the solution components to react. Thereafter the composite reaction product is dehydrated and, preferably, at least, a portion of the unreacted monohydric phenolic body is removed. The resulting product hardens at atmospheric temperature, forms a permanently fusible brittle resinous mass soluble in spirit solvents and in many other prior art solvents usually used for bringing phenolic resins into solution.

It is desired to point out that, proceeding as above set forth, water may be removed from the condensation products irrespective of the amount of monohydric phenolic body which is used in producing the resin, it having already been pointed out that using the prior art procedure, it was substantially impossible to adequately dehydrate the condensation product unless about 75% of a polyhydroxy benzene or a dihydroxy benzene such as resorcin was mixed in producing the mixed resin. Further, the method of the present invention produces a mixed resin which is substantially free of unreacted phenolic bodies and formaldehyde.

In accordance with the present invention, the melting point and cure range of the mixed resins may be varied by varying the amounts of the monohydric phenol-aldehyde reaction product and dihydroxy benzene-aldehyde reaction product in the mixture.

The present invention resides not only in the method of producing the mixed resin, but also in the mixed resin itself. It is thought broadly novel to provide a copolymer resinous product containing the in situ formed reaction product of a monohydric phenolic body and an aldehyde, and the reaction product of polyhydroxy benzene, particularly a dihydroxy benzene, and an aldehyde, said product being substantially free from unreacted monohydric phenolic bodies and preferably having a water content not greater than .75% to 1.0%.

The present invention also contemplates the production of a potentially heat reactive resin compound by blending the resinous mass produced as above set forth with a reactive methylene-containing hardening agent.

The present invention will be specifically disclosed in connection with the following example, which is illustrative and not by way of limitation:

A mixture of phenol, formaldehyde, oxalic acid crystals and water is made up in accordance with the following:

| | Grams |
|---|---|
| Phenol (12 moles) | 1128 |
| 37% formaldehyde sol | 660 |
| Oxalic acid crystals | 25 |
| Water | 50 |

The phenol is melted and poured into a suitable reaction vessel which may be a steel kettle provided with a steam jacket, a horse shoe agitator, a reflux condenser, a thermometer well, and an addition or sampling hole. To the phenol there is added, first, 660 grams of formaldehyde solution. The oxalic acid is then dissolved in 50 grams of water and while the contents of the kettle are being stirred by the agitator, the resulting oxalic acid solution is added. Steam is then admitted to the jacket and the contents of the kettle are gradually warmed to reflux state. The kettle is maintained at a gentle reflux, usually at a temperature of 95° to 98° C., until the reaction has proceeded to the point where the formaldehyde is substantially all tied up with the phenol.

Separately, 1320 grams of resorcin are dissolved in 660 grams of 37% formaldehyde solution. Solution may occur without any warming, but usually some slight warming is necessary. The warming should not be sufficient to cause any reaction between the resorcin and the formaldehyde. Usually, when warming is necessary, the temperature should not exceed 40° to 45° or 50° C. However, care must be taken to cool the formaldehyde solution of the resorcin immediately after the resorcin has dissolved in order to prevent any reaction occurring between the resorcin and the formaldehyde. The resorcin solution is advantageously cooled to between 0° and 30° C., but most satisfactorily between 0° and 10° C., and 10° and 20° C., and the solution is maintained in the cooled state until it is added to the reaction product present in the kettle. The resorcin solution may be cooled to a lower temperature than 0° C., but this is usually not necessary or desirable.

The cooled solution of resorcin and formaldehyde is added to the kettle through the reflux just rapidly enough to maintain steady reflux of the contents of the kettle, the reflux temperature usually varying from 94° to 102° C.

After all of the resorcin-formaldehyde solution has been combined with the monohydric phenol-aldehyde condensation product, the mixture is maintained under reflux conditions to insure that substantially all of the formaldehyde or other aldehyde present is substantially tied up. In other words, there should be, in the most desirable form of the method, no free formaldehyde at this stage of the condensation reaction. Usually 10 to 15 minutes are sufficient to obtain substantial elimination of all free formaldehyde.

Thereafter, the water present in the composite copolymer product is removed in any suitable manner, but preferably by vacuum distillation. The dehydration is effected preferably under a vacuum of 26 to 28 inches of mercury and a steam pressure of about 50 to 60 pounds. During the course of the dehydration step, between 1100 and 1200 grams of liquid are removed, and of this amount a small proportion, for example, 2.5% to 3.5%, is crude unreacted phenol. When the dehydration has been completed, the kettle is opened and the liquid resinous mass is poured off and allowed to solidify to a brittle resin containing less than .5% to 1.0% of water, and usually not over .75% as determined by the A. S. T. M. method. The brittle resin is transparent, pale amber in color, and is soluble in spirit solvents.

In the above example, the reaction is carried out between .68 of a mole of formaldehyde and 1 mole of phenol. The molecular ratio of the formaldehyde to the resorcin is also of the same order. In general, the molecular ratio of the formaldehyde to the monohydric phenolic body may vary from .5 to 1.0 of the former to .9 to 1.0 of the latter. The ratio between the formaldehyde and the resorcin may vary in a like manner. While the molecular ratios are of the same order, as above pointed out, it is within the province of the present invention to vary the molecular ratios of the component resinous materials and thereby provide a method of producing mixed resins of a predetermined melting point and having a predetermined curing range.

While the reaction in the kettle between the monohydric phenol and formaldehyde is carried out in the presence of oxalic acid as the catalyst, it is within the province of the present invention to use other catalysts in lieu of the oxalic acid. For example, any of the weak organic acids may be used, such as citric, tartaric, acetic, and the like. Any of the usual acid catalysts may be used, such as hydrochloric acid, sulphuric acid, phosphoric acid, and the like. When using an inorganic acid as a catalyst, it is preferable to use dilute solutions of the strong acids, or to use a weak inorganic acid such as boric acid.

While it is preferred to utilize as a catalyst for the polyhydroxy benzene-aldehyde reaction, that catalyst which is already in the kettle and which has been used in effecting the reaction between the monohydric phenolic body and the aldehyde, it is recognized that under some conditions it may be desirable to add additional catalysts to the kettle just prior to the addition of the polyhydroxy benzene-aldehyde solution, as for example, a solution of resorcin in formaldehyde.

In general, the amount of catalyst used in carrying out the complete reaction will vary from about .1% to 2%, taken upon the combined weight of the monohydric phenol and the dihydroxy benzene used in carrying out the invention. The percentage of catalyst is set forth by way of illustration, and as the preferred percentage. Obviously, the amount of catalyst used will vary depending upon the character of the reacting constituents and the specific manner in which the reaction is carried out.

Instead of using formaldehyde, other prior art aldehydes may be used, such as acetaldehyde, paraldehyde, propylaldehyde, the butyl aldehydes, furfuraldehyde, and the like. Instead of using a single aldehyde, a mixture of aldehydes may be used.

The resin produced from the example above set forth is composed of 50% phenol and 50% resorcin, taken on a molar basis. In general, it may be stated that the resinous mass produced by the method herein set forth may have a varying content of dihydroxy benzene and a varying content of monohydric phenol. The amount of dihydroxy benzene, as for example, resorcin, may vary from 1.0% resorcin to 99% resorcin, and, conversely, the percentage of monohydric phenol, as for example, phenol, $C_6H_5OH$, may vary from 99% to 1.0%, these percentages being taken on a molar basis. For example, 1% of resorcin refers to 1% of the total molar phenolic body present. Thus, if 1 mole of phenol and 99 moles of resorcin are reacted with 67 moles of formaldehyde, the phenol will represent 1% of the molar ratio and the resorcin 99%. All the percentages herein set forth of the monohydroxy benzene and the dihydroxy benzene respectively present in the final reaction composition are based upon the molar relationship which is exemplified by the above disclosure.

In accordance with the present invention, it is possible to produce resinous masses from any desired proportion of phenol constituent and any desired proportion of resorcin or equivalent constituent with an aldehyde. The resulting resins have softening points which bear a substantially straight line relationship between the monohydric phenol resins at one end and the dihydroxy benzene resins, as for example, resorcin, at the other end.

As the percentage of the monohydric phenol increases in the mixed resin, so does the stability of the resin in spirit solvents increase in the presence of a methylene-containing hardening agent such as hexamethylene tetramine. In such varnishes, the curing rate of thin films at 130° C. is substantially faster than straight monohydric phenol resins. For example, a mixed resin prepared in accordance with the present invention from a mixture containing 75% phenol and 25% resorcin, cures in about 45 seconds at 130° when mixed with hexamethylene tetramine, whereas a straight phenolic resin takes about 180 seconds when cured at the same temperature.

The mixed resins of the present invention possesses the advantage that they will cure at temperatures substantially lower than that at which the straight monohydric phenolic resins will cure. For example, while a straight phenolic resin may normally cure at 145° to 150° C., the resinous condensation product produced by reacting resorcin and phenol in accordance with the present invention, said reacting mixture having present 50% phenol and 50% resorcin on a molar basis, will cure in the presence of 8% to 12% of hexamethylene tetramine at a temperature of 120° to 125° C. in the same time as that required for the straight phenolic resin at the higher temperature.

The mixed permanently fusible resinous mass of the present invention may be made from the following mixtures:

| Per cent monohydric phenol | Per cent polyhydroxy benzene |
| --- | --- |
| 90 | 10 |
| 80 | 20 |
| 70 | 30 |
| 60 | 40 |
| 50 | 50 |
| 40 | 60 |
| 30 | 70 |
| 20 | 80 |
| 10 | 90 |
| 5 | 95 |
| 1 | 99 |

The above percentages are taken on a molar basis.

In the above table, the monohydroxy phenol may be phenol per se, $C_6H_5OH$, or a substitution product thereof, such as cresol, $CH_3C_6H_4OH$, or crude cresylic acid which contains a small amount of phenol, the three cresols, ortho, meta and para, and usually considerable amounts of higher phenols including various xylenols.

The polyhydroxy benzene may be resorcin, catechol, hydroquinone, or any of the polyhydroxy phenols or benzenes.

In general, from 8% to 12% of hexymethylene tetramine may be added to the resinous mass produced by the present invention to form the final potentially reactive composition, which, on heat treatment, forms an infusible resin insoluble in most of the ordinary solvents. The hexamethylene tetramine may be mixed with the dry brittle resin or a solution of the hexamethylene tetramine may be added to a solution of the resinous mass produced by the condensation method herein set forth.

While hexamethylene tetramine has been set forth as the most desirable hardening agent, it is desired to point out that the various oxymethylenes, paraform, or any polymer or homolog of formaldehyde may be used.

Plywood or any other cellulosic laminae and organic laminae which do not deteriorate at a temperature ranging between 210° and 220° F. may have interposed therebetween the two-step resin herein disclosed. To the resinous mass containing, as for example, 50% of resorcin and 50% of phenol, there may be added 10% of a hardening agent such as hexamethylene tetramine, said percentage being taken on the combined weight of the phenol and the resorcin used to react with the formaldehyde. The above mixture may be used in a dry state or may be dissolved in a volatile solvent such as denatured alcohol, acetone, or the like. Sufficient resin should be present in the resin solution so that when the resin is applied by spray or a roller spreader, the required amount of bonding material is evenly distributed onto the surface of the sheet of material which is to be glued, as for example, wood, leather, plies of cardboard, and the like. The laminated material having the above bonding agent may be cured at a temperature as low as 120° to 125° C.

The mixed resinous mass of the present invention, when blended with sufficient added methylene-containing agent such as hexamethylene tetramine may be used for bonding and laminating where superior strength, lower curing temperature, faster cure period, and substantially odorless finished pieces are desired. The reactive resin compound containing the hexamethylene tetramine may be employed as a molding compound, as a bonding agent for abrasive articles, and, in general, wherever an adhesive is desired. The reactive resin containing the hexamethylene tetramine may be used for any of the purposes set forth in my copending application Serial No. 426,629, filed January 13, 1942.

The copolymer mixed resins produced in accordance with the present invention may be used in the preparation of molding compounds, the latter being well known in the art. The following is a representative example of a suitable molding compound:

| | Parts |
|---|---|
| Mixed resin compound | 50 |
| Woodflour | 48 |
| Dye | 1½ |
| Lubricant | ½ |

This composition is worked and blended on heated friction rolls, as is well known in the art. The resin compound referred to in the above composition may be composed of any of the mixed resins herein set forth, as for example, that produced by the herein illustrative composition, said example producing a mixed resin composed of 50% phenol and 50% resin taken on a molar basis. However, the amount of dihydroxy benzene compound and monohydric phenol compound may vary as previously set forth. This mixed resin illustratively has present 10 parts of a methylene-containing hardening agent such as hexamethylene tetramine.

In preparing a homogeneous mixture on the rolls, the latter are maintained at a temperature usually varying from 80° C. to 150° C., this temperature depending largely on the curing temperature of the resin and the composition of the molding mixture.

While in the above illustrative example, ½ part of a lubricant is included, it has been discovered that in many cases the presence of the resorcin-aldehyde resin, or at least the reaction product of resorcin and aldehyde, prepared as herein set forth when preparing the mixed resin, obviates the necessity of using a lubricant. This is a decided advantage.

It is obvious that the woodflour may be substituted in part or totally by mineral fillers such as calcium carbonate, kieselguhr, which are illustrative of inorganic fillers, and by other cellulosic materials or the equivalents thereof which are representative of organic fillers. In other words, the filler may be an organic filler, as well known in the art, or an inorganic filler.

After a homogeneous mixture has been made on the rolls, the material may be cooled and prepared by methods well known in the art.

The drawing accompanying the present invention depicts the average melting or softening points of various mixed resins where the molar formaldehyde-phenolic body ratio is maintained constant, said ratio being 0.67:1.0. While the drawing depicts the relationship between phenol $C_6H_5OH$ and resorcin, the phenol is representative of a monohydroxy phenol body and the resorcin is representative of a dihydroxy benzene body. Substantially the same relationship holds for various monohydroxy phenolic bodies and dihydroxybenzene compounds including those herein specifically set forth.

Having thus described the invention, what is claimed as new and desired to be secured by Letters Patent is:

1. The method of producing a permanently fusible resinous mass comprising forming under reflux conditions and in the presence of an acid catalyst an undehydrated reaction product of a monohydric phenol body with an aldehyde, substantially all the latter being reacted with the former the ratio of the aldehyde to the phenol being maintained to produce a permanently fusible resin, separately dissolving a polyhydroxy benzene body in an aldehyde, while substantially inhibiting any reaction between said constituents during the solution step, the ratio of the aldehyde to the polyhydroxy benzene being maintained to produce a permanently fusible resin adding said solution to the undehydrated reaction product while the latter is maintained at an elevated reaction temperature, thereby, reacting the constituents of said solution in the presence of the acid catalyst and in the presence of said monohydric phenol-aldehyde reaction product until substantially all of the aldehyde is combined with said polyhydroxy benzene, and dehydrating the resulting reaction mass.

2. The method of claim 1 wherein the polyhydroxy benzene is a dihydroxy benzene.

3. The method of claim 1 wherein the polyhydroxy benzene is resorcin.

4. The method of claim 1 wherein the aldehyde is formaldehyde.

5. The method of claim 1 wherein the monohydric phenol body is phenol, the polyhydroxy benzene body is resorcin, and the aldehyde is formaldehyde.

6. The method of producing a permanently fusible resinous mass comprising forming under reflux conditions and in the presence of an acid catalyst an undehydrated reaction product of a monohydric phenol body with an aldehyde substantially all of the latter being reacted with the former, the ratio of the aldehyde to the phenol being maintained to produce a permanently fusible resin, separately dissolving a polyhydroxy benzene body in an aldehyde, cooling the resulting solution to inhibit any substantial reaction between said constituents during the solution step, the ratio of the aldehyde to the polyhydroxy benzene being maintained to produce a permanently fusible resin, adding said solution to the undehydrated reaction product while the latter is maintained at an elevated reaction temperature, thereby reacting the constituents of said solution in the presence of the acid catalyst and in the presence of said monohydric phenol-aldehyde reaction product until substantially all of the aldehyde is combined with said polyhydroxy benzene, and dehydrating the resulting reaction mass.

7. The method of producing a permanently fusible resinous mass comprising forming under reflux conditions in the presence of an acid catalyst an undehydrated reaction product of a monohydric phenol body with an aldehyde substantially all of the latter being reacted with the former, the ratio of the aldehyde to the phenol being maintained to produce a permanently fusible resin, separately dissolving a polyhydroxy benzene body in an aldehyde while substantially inhibiting any reaction between said constituents during the solution step, the ratio of the aldehyde to the polyhydroxy benzene being maintained to produce a permanently fusible resin adding said solution to the undehydrated reaction product while the latter is maintained at an elevated reaction temperature, thereby, reacting the constituents of said solution in the presence of the acid catalyst and in the presence of said monohydric phenol aldehyde reaction product until substantially all of the aldehyde is combined with said polyhydroxy benzene, and dehydrating the resulting reaction mass to a water content less than 1%.

8. The method of producing a permanently fusible resinous mass comprising forming under reflux conditions and in the presence of an acid catalyst an undehydrated reaction product of a monohydric phenol body with an aldehyde substantially all of the latter being reacted with the former, the ratio of the aldehyde to the phenol being maintained to produce a permanently fusible resin, separately dissolving a polyhydroxy benzene body in an aldehyde while substantially inhibiting any reaction between said constituents during the solution step, the ratio of the aldehyde to the polyhydroxy benzene being maintained to produce a permanently fusible resin adding said solution to the undehydrated reaction product while the latter is maintained at an elevated reaction temperature, thereby, reacting the constituents of said solution in the presence of the acid catalyst and in the presence of said monohydric phenol-aldehyde reaction product until substantially all of the aldehyde is combined with said polyhydroxy benzene, dehydrating the resulting reaction mass, and mixing the dehydrated permanently fusible resinous mass with a hardening agent to produce a heat reactive resin compound.

9. The method of producing a permanently fusible resinous mass comprising forming under reflux conditions and in the presence of an acid catalyst an undehydrated reaction product of a monohydric phenol body with an aldehyde substantially all of the latter being reacted with the former, the ratio of the aldehyde to the phenol being maintained to produce a permanently fusible resin, separately dissolving a polyhydroxy benzene body in an aldehyde while substantially inhibiting any reaction between said constituents during the solution step, the ratio of the aldehyde to the polyhydroxy benzene being maintained to produce a permanently fusible resin adding said solution to the undehydrated reaction product while the latter is maintained at an elevated reaction temperature, thereby reacting the constituents of said solution in the presence of the acid catalyst and in the presence of said monohydric phenol-aldehyde reaction product until substantially all of the aldehyde is combined with said polyhydroxy benzene, dehydrating the resulting reaction mass to a water content less than 1%, and mixing the dehydrated permanently fusible resinous mass with a hardening agent to produce a heat reactive resin compound.

10. The method of producing a permanently fusible resinous mass comprising forming under reflux conditions in the presence of an acid catalyst an undehydrated reaction product of phenol with formaldehyde, substantially all of the latter being reacted with the former, the ratio of the formaldehyde to the phenol being maintained to produce a permanently fusible resin, separately dissolving resorcin in formaldehyde, while substantially inhibiting any reaction between said constituents during the solution step, the ratio of the formaldehyde to the resorcin being maintained to produce a permanently fusible resin, adding said solution to the undehydrated reaction product while the latter is maintained at an elevated reaction temperature, thereby reacting the constituents of said solution in the presence of said phenol-formaldehyde reaction product until substantially all of the formaldehyde is combined with the resorcin and dehydrating the resulting reaction mass.

11. The product of the method of claim 10.

12. The product of the method of claim 1.

13. The method of producing a permanently fusible resinous mass comprising forming under reflux conditions and in the presence of an acid catalyst an undehydrated reaction product of phenol and formaldehyde, substantially all of the latter being reacted with the former, the ratio of the formaldehyde to the phenol being maintained to produce a permanently fusible resin, separately dissolving resorcin in formaldehyde, cooling the resulting solution to inhibit any substantial reaction between said constituents during the solution step, the ratio of the formaldehyde to the resorcin being maintained to produce a permanently fusible resin, adding said solution to the undehydrated reaction product while the latter is maintained at an elevated reaction temperature, thereby reacting the constituents of said solution in the presence of the acid catalyst and in the presence of the phenol-formaldehyde reaction product until substantially all of the formaldehyde is combined with the resorcin, and dehydrating the resulting resinous reaction mass.

PHILIP HAMILTON RHODES.